United States Patent [19]

Van Atta

[11] 4,021,847

[45] May 3, 1977

[54] COMPENSATION CIRCUIT FOR PYROELECTRIC VIDICON SYSTEM

[75] Inventor: Peter W. Van Atta, Woodbridge, Va.

[73] Assignee: The United States of America as represented by the Secretary of the Army, Washington, D.C.

[22] Filed: July 15, 1976

[21] Appl. No.: 705,498

[52] U.S. Cl. .............................. 358/113; 358/222; 178/DIG. 8; 178/DIG. 40
[51] Int. Cl.² ...................... H04N 5/33; H04N 5/34
[58] Field of Search ................. 358/113, 165, 222; 178/DIG. 8, DIG. 40; 250/333

[56] References Cited

UNITED STATES PATENTS

| | | | |
|---|---|---|---|
| 3,087,986 | 4/1963 | De Brosse | 358/113 X |
| 3,829,192 | 8/1974 | Wheeler | 358/113 X |

Primary Examiner—Robert L. Richardson
Assistant Examiner—Aristotelis M. Psitos
Attorney, Agent, or Firm—Nathan Edelberg; John E. Holford; Robert P. Gibson

[57] ABSTRACT

A correction circuit for a pyroelectric vidicon system wherein the image is scanned by an oscillating or rotating mirror is provided which operates only on the synchronization and blanking pulses so as to remove image motion from the video signal.

2 Claims, 2 Drawing Figures

COMPENSATION CIRCUIT FOR PYROELECTRIC VIDICON SYSTEM

The invention described herein may be manufactured, used, and licensed by the government for governmental purposes without the payment of any royalties thereon.

BACKGROUND OF INVENTION

Pyroelectric vidicon tubes offer certain advantages in terms of cost and simplicity over conventional vidicon tubes and infrared viewing devices currently in use. The target material has limitations with regard to sensitivity and response time at present, but materials research could provide a breakthrough in these areas at any time. The outstanding difficulty in that the pyroelectric effect is an ac phenomenon, i.e. the target is electrically polarized only in response to a change in radiation. To view a still scene or image it is necessary to either chop the incident radiation with a shutter or scan the image with a moving mirror before it strikes the target material. The success of the latter method depends on the rate of displacement of the scene and this together with the size and resolution capabilities of the target determines the minimum displacement of the mirror.

This displacement is reproduced in display device, which may be a commercially available TV set, and can be very distracting to the viewer. A simple method of removing it is to place the screen of the TV set adjacent the back surface of the mirror and view the display's reflected image as the mirror rotates. Unfortunately this results in a very bulky arrangement of the system and further is impractical where remote viewing is desired. A better method is disclosed in Pat. Application Ser. No. 663,033 to John T. Hall for "Electronic Motion Compensation for the Pyroelectric Vidicon," filed Mar. 2, 1976. This application also discloses other details of the vidicon system which are not considered essential for understanding the present disclosure.

BRIEF DESCRIPTION OF INVENTION

The purpose of the present invention is to present a different approach to the solution of the same problem approached in the above patent application which may be preferred in some applications, depending on the cost and availability of components or other considerations.

BRIEF DESCRIPTION OF DRAWINGS

The invention is best understood with reference to the accompanying drawings wherein.

DESCRIPTION OF THE PREFERRED EMBODIMENT

Figure 1:
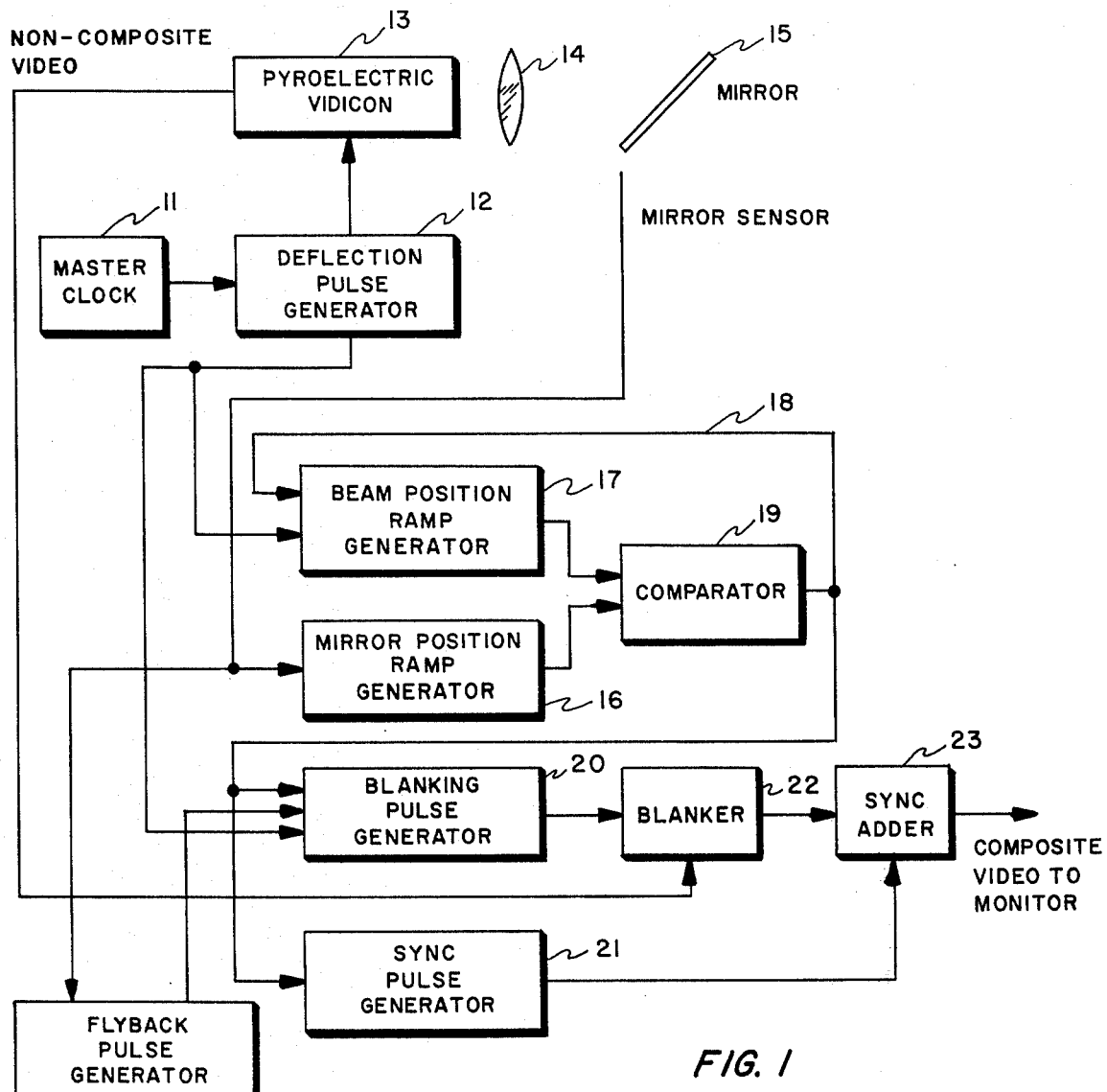
FIG. 1 shows a block diagram of the complete vidicon system and compensation circuit.

Referring to FIG. 1 there is shown a block diagram of the vidicon system according to the present invention, the circuits within the blocks all being conventional TV circuits most of which now available as integrated circuits in solid state form or can easily be fabricated from descrete components by those skilled in the art. All blocks require a power supply as is well known in the art, but is omitted here to simplify the diagram. All electronic signals are controlled by an electronic master clock 11 which may be 31.5Kh$_z$ with electronic dividers to produce such pulses as are required for horizontal and vertical scan frequencies, preferably 15.75Kh$_z$ and 60 hertz as in commercial television. These signals drive a deflection pulse generator 12 which supplies the sawtooth voltages of correct waveform to direct the electron beam over the surface of the pyroelectric target material in a vacuum tube vidicon 13. The generator 12 also supplies timing signals for standard equalization and blanking pulses required at the receiver.

At the same time the radiation from a distant scene is focussed by one or more lenses such as lens 14 before or after (or both before and after) it strikes mirror 15 and is reflected onto the surface of the pyroelectric target material in vidicon 13. As the mirror rotates a non-composite video signal appears at the output of the vidicon, i.e. the signal has incoherent information corresponding to the time position of the blanking pulses from generator 12, but has no synchronization or blanking pulses. Normally the mirror rotates thru a small angle and snaps back to its original position using a precisely controlled servomechanism, but a similar effect can be achieved by a multifaceted mirror rotating constantly, as is well known in the art. Both types of mirrors require a few frames of electronic scanning to reposition the scene at the start of a new frame after a mirror scan is completed. This is the source of an additional incoherent portion of the noncomposite video signal.

To control the remaining circuits of the vidicon system a sensor is attached to the mirror and/or its drive system to generate a first timing pulse when the mirror reaches the end of its scan. The sensor can be a switch, electric eye or other device activated by the mirror. This pulse actuates a mirror position ramp generator 16 which produces a sawtooth waveform having an amplitude proportional to the displacement of the scene on the vidicon target. For small angles of scan this will be proportional to the deflection angle measured from the beginning of a scan. If in addition the angular velocity is uniform the waveform will be linear. In some servosystems such as waveform will be generated in the mirror drive and generator 16 can then by bypassed. A beam position ramp generator 17 simultaneously generates a sawtooth signal which is controlled by the horizontal synchronizing pulses from the deflection pulse generator 12. This sawtooth and that from generator are applied to comparator 19, which in turn produces a timing pulse delayed with respect to the horizontal synchronizing pulse when the amplitudes of both sawtooth waveforms are equal. The delay of the timing pulse corresponds to the delay in the beginning of each video line due to the displacement of the scene by the mirror.

Figure 2:
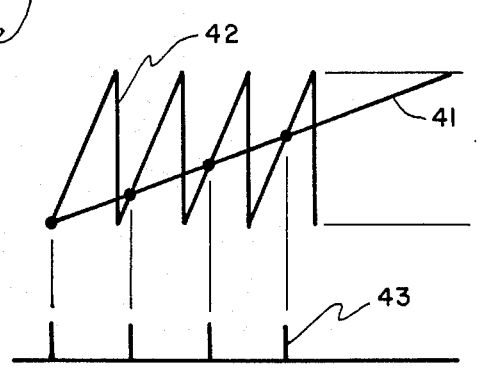
FIG. 2 shows an exaggerated diagram of signals applied to the comparator in FIG. 1.

Referring to FIG. 2 the output waveforms of generators 16 and 17 are shown superimposed. Curve 41 is the output of generator 16 and curve 42 is the output of generator 17. Curve 43 shows the position of output pulses 43 from comparator 19. It is easily seen that the periods of the pulses 43 are slightly longer than the periods of the horizontal synchronization pulses of clock 11 which occur at miminum points of curve 42. The magnitude of curve 42 is exaggerated for clarity. This curve must have $n$ times the maximum amplitude of curve 41, where $n$ is the ratio of the actual width rectangular scene projected on the target to the maximum displacement of the scene, e.g. $n = 10$ for a 10% displacement. The electron beam of course always scans all of the target area on which any scene may be projected.

Returning again to FIG. 1. The output pulses from the comparator are used to trigger a synch pulse generator 21 and a blanking pulse generator 20. The synch pulses occur at a slightly different time than those from clock 11, but remain within the synchronization limit of the horizontal oscillators in commercial TV sets. The blanking pulse generator 20 is also fed the blanking pulses from deflection pulse generator 12. The two blanking pulses overlap to provide a stretched blanking period which increases as the mirror scans to mask out the later return trace of the horizontal sawtooth pulses that will be generated in the display. Blanker 22 adds the stretched blanking pulses to the non-composite video signal. Synch adder 23 similarly adds the synch pulses (and equalizing pulses) from generator 21 to the same signal. The resulting signal is now fully campatible with commercial TV receivers. A flyback pulse generator 24 synchronized with pulses from the mirror sensor supplies a pulse during the return trade period of the mirror, which in turn drives the blanking pulse generator to add yet another blanking pulse thereby eliminating the incoherent vidio information generated during that period.

While many variations of the above described circuits will be obvious to those skilled in the art, the invention is limited only as described in the claims which follow.

I claim:

1. In a pyroelectric vidicon system wherein a rotating mirror periodically slowly scans a rectangular radiation scene horizontally across the target material of a vidicon tube primarily in one direction only while a set of horizontal and vertical sawtooth generators scan an electron beam over the same target many times to generate a TV type non-composite video signal, a compensation circuit comprising:

a mirror position sensor means coupled to said mirror to generate a first timing pulse at the beginning of each mirror scan;

a mirror position ramp generator means coupled to said mirror sensor means to initiate a first sawtooth waveform having an amplitude proportional to the change in position of said scene as a function of time from each timing pulse;

a beam position ramp generator means coupled to said horizontal sawtooth wave generator to initiate a second linear sawtooth waveform synchronized to the output of said horizon generator and having an amplitude equal to $n$ times the amplitude of said output where $m$ is the ratio of the width of the scene to the maximum change in position of the scene;

a comparator means coupled to said mirror position and beam position ramp generators for generating a delayed timing pulse when the amplitude of both said ramp generators are equal;

a synch pulse generator means coupled to said comparator means to generate a synch pulse for each said delayed timing pulse; and adder means connected between said vidicon system and said synch pulse generator to combine said video signals with said synch pulses.

2. A pyroelectric vidicon system according to claim 1, further including:

a master clock coupled to and synchronizing said horizontal and vertical sawtooth generators;

a deflection pulse generator means coupled to said clock to generate blanking pulses during horizontal and vertical retrace periods;

a blanking pulse generator means coupled to said deflection pulse generator and said comparator to generate additional blanking pulses in response to said delayed timing pulses and to combine them with the blanking pulses from said deflection pulse generator; and blanker means coupled between said blanking pulse generator and said vidicon tube for adding the combined blanking pulses from said blanking pulse generator to said non-composite video signal.

* * * * *